United States Patent
Yeh et al.

(10) Patent No.: US 9,475,268 B2
(45) Date of Patent: Oct. 25, 2016

(54) PROCESS FOR PRODUCING A LAMINATED GLASS PANE WITH SENSOR WINDOW

(71) Applicant: SAINT-GOBAIN GLASS FRANCE, Courbevoie (FR)

(72) Inventors: Li-Ya Yeh, Geilenkirchen (DE); Bastien Royer, Remagen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 177 days.

(21) Appl. No.: 14/371,732

(22) PCT Filed: Feb. 5, 2013

(86) PCT No.: PCT/EP2013/052202
§ 371 (c)(1),
(2) Date: Jul. 10, 2014

(87) PCT Pub. No.: WO2013/131698
PCT Pub. Date: Sep. 12, 2013

(65) Prior Publication Data
US 2015/0013884 A1    Jan. 15, 2015

(30) Foreign Application Priority Data

Mar. 5, 2012  (EP) .................................... 12158021

(51) Int. Cl.
*B32B 37/14*    (2006.01)
*B23K 26/12*    (2014.01)
(Continued)

(52) U.S. Cl.
CPC ............. *B32B 37/14* (2013.01); *B23K 26/082* (2015.10); *B23K 26/12* (2013.01); *B23K 26/123* (2013.01);
(Continued)

(58) Field of Classification Search
CPC ............ B23K 26/126; B23K 2203/42; B23K 2203/172; B23K 26/12; B23K 26/082; B23K 26/362; B23K 26/40; B23K 26/402; B32B 17/10036; B32B 17/10174; B32B 17/10761; B32B 17/10981; B32B 17/10; B32B 37/14; B32B 38/0012; B32B 38/10; B32B 2367/00
See application file for complete search history.

(56) References Cited

U.S. PATENT DOCUMENTS 5,227,608 A    7/1993   Yoshida
5,501,944 A *  3/1996   Hill ...................... B23K 26/009
                                                      430/201
(Continued)

FOREIGN PATENT DOCUMENTS

AT            409430       10/2008
DE        212005000055      8/2007
(Continued)

OTHER PUBLICATIONS

Machine translation of EP 2325002A1.*
(Continued)

*Primary Examiner* — Jacob T Minskey
*Assistant Examiner* — Vishal I Patel
(74) *Attorney, Agent, or Firm* — Steinfl & Bruno, LLP

(57) ABSTRACT

A process for producing a laminated glass pane made up of a base pane, a first laminating film, a coated polymer film with a coating, a second laminating film, and a top pane having at least one sensor window is described. The process has steps a) to d), wherein a) the coated polymer film with the coating is tensioned pointing upward by way of a vacuum table, b) at least one region from which the coating is removed is produced on the coated polymer film by means of laser treatment, c) the first laminating film is arranged on the base pane, the coated polymer film is arranged on the first laminating film, the second laminating film is arranged on the coated polymer film and the top pane is arranged on the second laminating film, and d) the arrangement is autoclaved. The region from which the coating is removed is produced by way of glass plates with which the vacuum table is equipped.

14 Claims, 8 Drawing Sheets

Figure 1:
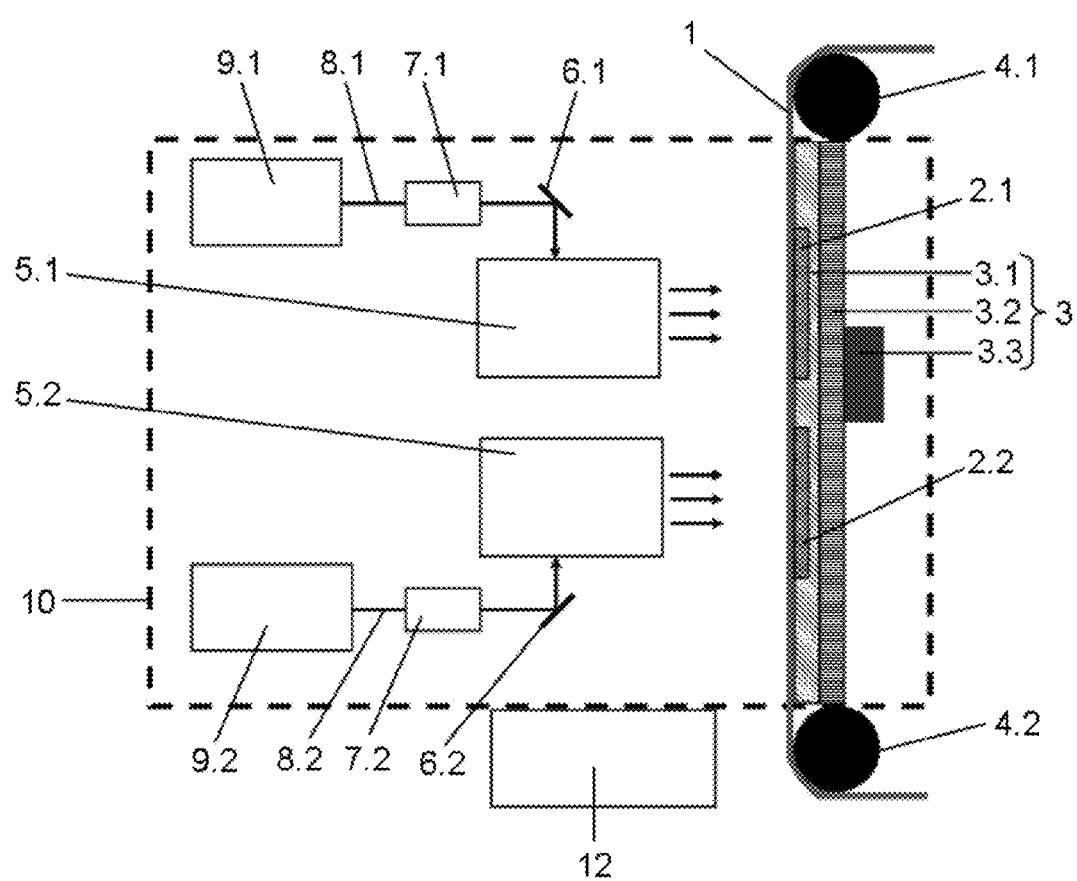

(51) Int. Cl.
- *B32B 17/10* (2006.01)
- *B32B 38/00* (2006.01)
- *B32B 38/10* (2006.01)
- *B23K 26/36* (2014.01)
- *B23K 26/40* (2014.01)

(52) U.S. Cl.
CPC .......... *B23K 26/362* (2013.01); *B23K 26/40* (2013.01); *B23K 26/402* (2013.01); *B32B 17/10* (2013.01); *B32B 17/10036* (2013.01); *B32B 17/10174* (2013.01); *B32B 17/10761* (2013.01); *B32B 17/10981* (2013.01); *B32B 38/0012* (2013.01); *B32B 38/10* (2013.01); *B23K 2203/172* (2015.10); *B23K 2203/42* (2015.10)

(56) References Cited

U.S. PATENT DOCUMENTS

| | | |
|---|---|---|
| 2001/0006766 A1 | 7/2001 | O'Brien et al. |
| 2003/0075531 A1 | 4/2003 | Kupisiewicz |

FOREIGN PATENT DOCUMENTS

| | | |
|---|---|---|
| DE | 102008038118 | 2/2010 |
| EP | 0257723 | 3/1988 |
| EP | 1605729 | 12/2005 |
| EP | 1880790 | 1/2008 |
| EP | 2325002 | 5/2011 |
| GB | 2458986 | 10/2009 |
| JP | 59092192 | 11/1985 |
| JP | 61262187 | 5/1988 |
| JP | 2004298885 | 10/2004 |
| WO | 2004049876 | 6/2004 |

OTHER PUBLICATIONS

Machine translation of JP 2004-298885.*

Written Opinion mailed on Mar. 4, 2013 for International Application PCT/EP2013/052202 filed on Feb. 5, 2013 in the name of Saint-Gobain Glass France (German original with English Translation).

International Search Report mailed on Mar. 4, 2013 for International Application PCT/EP2013/052202 filed on Feb. 5, 2013 in the name of Saint-Gobain Glass France (German original with English Translation).

* cited by examiner

PROCESS FOR PRODUCING A LAMINATED GLASS PANE WITH SENSOR WINDOW

CROSS REFERENCE TO RELATED APPLICATIONS

The present application is the US national stage of International Patent Application PCT/EP2013/052202 filed on Feb. 5, 2013 which, in turn, claims priority to European Patent Application EP 12158021.1 filed on Mar. 5, 2012.

The present invention relates to a process for producing a laminated glass pane with a sensor window.

In the context of the increasing safety requirements applied to motor vehicles, they are increasingly frequently equipped with a wide variety of optical sensors. These include, among others, sensors in parking assistance systems and lane departure warning systems as well as proximity sensors. These systems are capable of warning the driver of hazards even at night or under severe road conditions. Particularly with poor visibility, the driver can hardly react in a timely manner to pedestrians or other vehicles that suddenly appear in front of the motor vehicle. Camera systems detect such hazards in a timely manner and warn the driver. Especially at high speeds, the assessment of the proper following distance is difficult for the driver. By means of electronic distance measuring and automatic warning of the driver in the event of an excessively short following distance, rear-end collisions can be effectively prevented. The use of such assistance systems can actively improve road traffic safety. These assistance systems operate with cameras, night vision cameras, residual light amplifiers, infrared detectors, or laser distance meters. The forward directed sensors are usually arranged behind the windshield to protect them against environmental influences.

In addition to safety-relevant aspects, ecological considerations and vehicle comfort are also of particular significance. Exhaust emissions and also fuel consumption should be minimized as much as possible. Immediately following long standing times in direct sunlight, the energy consumption of the air-conditioning system is high. This results in increased fuel consumption and exhaust emissions. Moreover, strong heating of the vehicle interior negatively affects the comfort of the occupants. The heating of the vehicle interior can be reduced by the use of laminated glass panes with sun protection coating. Such laminated glass panes filter the infrared portion of the sunlight. For this, primarily polyester films are used in the film composite of the laminated glass pane. Preferably, a PET film is used, placed between two PVB films, with the PET film being provided with an IR radiation reflecting coating. For this purpose, metal-coated PET films or other polyester films are used. Preferably, a silver coating is used. Alternatively, coatings that reflect other parts of the electromagnetic spectrum, such as UV radiation, can also be applied. In addition to such sun protection coatings, heatable coatings in composite glass panes are also known. Likewise, in the heatable coatings, metal-coated polyester films are used in the film composite.

The use of such metal-coated films in the film composite of the laminated glass pane is hardly possible in combination with camera systems. The camera systems use both light in the visible range of spectrum and in the infrared and ultraviolet wavelength range. Sun protection coatings in laminated glass panes filter certain portions of these wavelength ranges and, thus, render the use of camera systems behind the pane more difficult. The metal coating of the film composite must thus be removed in the region of the camera. Such sensor windows can, for example, be made by cutting out the PET film at the appropriate location in the film composite. However, this causes the wrinkling on the boundaries between the sensor window without PET film and the remaining window area with PET film.

EP 1 605 729 A2 discloses an electrically heatable laminated glass pane with a sensor window behind which a camera is installed. In the viewing area of the camera, the laminated glass pane is heated to prevent the formation of condensation or ice in this region. First, a piece of the film interlayer of the laminated glass is removed in the region of the sensor window. A heating element mounted on an appropriately sized piece of the film interlayer is placed in this cutout. This heating element is laminated into the film composite of the laminated glass pane. In addition, a second heating element can be installed on the surface of the pane.

GB 2458986 discloses a device for patterning thin films on continuous flexible substrates. The flexible substrate is present in the form of a roll. On one side of the device, the substrate is rolled off a transport roller and rerolled onto a second transport roller on the other side after processing. The processing of the substrate surface can take place either through printing with an inkjet printer or through patterning with a laser. For this, the substrate is fixed on a vacuum table between the two transport rollers to prevent wrinkling during processing. The printing head or the laser is situated perpendicular to the film surface. This device enables ablating a coating from the surface of a thin-film by means of laser treatment.

EP 2 325 002 A1 discloses a method for producing a laminated glass pane with a sensor window, wherein the metal coating of the polymer film is ablated in the region of the sensor window by means of a laser process. The polymer film does not have to be cut in the region of the sensor window. Thus, wrinkling on the edges of the sensor window is avoided and no optical irregularities appear in this region.

In the processes known to date for laser treatment of a metal-coated polymer film, the polymer film is fixed on a vacuum table and processed by means of a laser, with the laser striking the vacuum table through the polymer film. However, the laser damages the vacuum table and ablates metal particles from the table surface. These metal particles very readily adhere to the surface of the films. During the rerolling of the processed coated polymer film, the adhering metal particles end up in the intermediate spaces of the rolled-up film. In this manner, the metal particles also come into contact with the coating of the coated polymer film and damage it. Such damage and scratches in the coating are not only optical defects in the finished product, but they also promote corrosion of the coating. For this reason, damage to the coating must absolutely be avoided. Consequently, the vacuum table must be cleaned regularly to remove these metal particles. Alternatively, a protective film can also be placed between the polymer film and the vacuum table, with the metal particles adhering to the protective film and not coming into contact with the polymer film. The application of the protective film or the cleaning of the vacuum table represent an additional manual work step, which slows down the production process.

The object of the present invention consists in providing a process for producing a laminated glass pane with at least one sensor window, which enables fully automated processing of polymer films by laser, in which the vacuum table is not damaged by the laser beam and no cleaning of the vacuum table is necessary.

The object of the present invention is accomplished according to the invention by a process for producing a laminated glass pane with at least one sensor window and a device for processing polymer films by means of laser treatment.

The process for producing a laminated glass pane with a sensor window comprises processing a coated polymer film by means of laser treatment on a vacuum table overlaid with glass plates as well as producing a laminated glass pane using this processed coated polymer film. In a first step, the coated polymer film is placed on the vacuum table with the coating pointing upward and tensioned by application of negative pressure. Here, "pointing upward" means "pointing away from the vacuum table". The uncoated side of the polymer film or the side of the polymer film not to be processed lies directly on the surface of the vacuum table. The coating of the coated polymer film, which is to be processed by the laser, points, in contrast, in the direction of the laser and thus points, after placement of the polymer film on the vacuum table, upward away from this vacuum table. In the region of the glass plates, a decoated region is created on the coated polymer film by means of laser treatment. In this decoated region, the coating of the coated polymer film has been ablated by means of laser treatment. The processed coated polymer film with a decoated region is then used in the film composite of a laminated glass pane. For this, a first laminating film is placed on a base pane and the coated polymer film with a decoated region is placed on the first laminating film. A second laminating film is placed on the coated polymer film and the stack of films is completed with a cover pane. This arrangement is then first pre-evacuated in a plastic bag and then processed in the autoclave. The processing in the autoclave takes place at 50° C. to 150° C., preferably 80° C. to 120° C. and at a pressure from 5 bar to 15 bar, preferably 8 bar to 13 bar, for a period of 1 hour to 4 hours, preferably 2 hours to 3 hours.

The base pane and the cover pane contain soda lime glass, quartz glass, borosilicate glass, or polymethyl methacrylate.

The base pane and the cover pane have a thickness from 1 mm to 20 mm, preferably 2 mm to 6 mm.

The vacuum table for fixing the coated polymer film comprises a swivel arm, a bottom plate mounted on the swivel arm, and a top plate affixed on the bottom plate. The bottom plate and the top plate are defined by their arrangement relative to the swivel arm of the vacuum table. Even during a rotation of the swivel arm, the plate mounted directly on the swivel arm is defined as the bottom plate and the plate mounted on the bottom plate is defined as the top plate. The swivel arm enables a precise approach of the vacuum table to the film surface. When no negative pressure is applied, the polymer film does not touch the vacuum table such that the film is not scratched during transport by transport rollers. However, the distance between the vacuum table and the film surface should also not be too great so that the film is completely sucked against the table surface upon application of the negative pressure. Moreover, the vacuum table can be removed laterally by the swivel arm, by which means a simple exchange of the top plate of the vacuum table is possible.

The vacuum table contains a metal or ceramic plate as the top plate, in which holes that function as vacuum nozzles are made. The metal plate preferably contains aluminum. With the use of ceramic plates, porous materials can also be used such that no additional holes need be introduced into the top plate.

The vacuum table is preferably arranged vertically, since, thus, the footprint required for the system is minimized and the system can be structured as space-savingly as possible. The normal vector of the plane of the vacuum table is aligned horizontally. Even with such a vertical arrangement of the vacuum table, the arrangement of the bottom plate and top plate relative to the swivel arm as well as the arrangement of the coated polymer film relative to the vacuum table are retained. Moreover, a vertical arrangement of the vacuum table can simplify the further processing of the coated polymer film. When the further processing occurs, for example, on a floor located above, the film can be transferred vertically upward to the next floor via transport rollers after the laser treatment.

The glass plates are inlaid in countersinks of the top plate of the vacuum table. For this, indentations that correspond in their shape and size to the glass plates are milled into the top plate of the vacuum table. The depth of the countersinks is determined by the thickness of the glass plates. The glass plates must fit exactly since no edge can remain at the transition between the glass plate and the vacuum table after the insertion of the plates. Irregularities in the surface of the vacuum table would result, upon application of negative pressure, in damage to the coated polymer film. The position of the glass plates depends on the position of the sensor window of the subsequent laminated glass pane since the glass plates are mounted on the vacuum table only in the region of the coated polymer film to be processed. The glass plates are attached only to the removable top plate of the vacuum table. Thus, a single vacuum table can be used for extremely varied pane models by a simple exchange of the top plate.

The attachment of the glass plates is accomplished by an adhesive, preferably from the group epoxy resins, polyurethane adhesive, silicones, cyanoacrylate adhesives, and/or mixtures thereof, particularly preferably epoxy resins. Alternatively, the glass plates can also be attached by an adhesive strip. Surprisingly, the glass plates prevent damage to the vacuum table and thus also the formation of metal particles that adhere to the coated polymer film and damage it.

The glass plates contain soda lime glass, quartz glass, borosilicate glass; preferably, float glass is used.

The glass plates have a thickness from 1 mm to 10 mm, preferably 2 mm to 6 mm.

The coated polymer film is rolled off and rolled on in sections by two transport rollers above and below the vacuum table such that only the section of the film to be processed is present in the unrolled state. The terms "above and below the vacuum table" refer to a vertically arranged vacuum table. In another arrangement of the vacuum table, the transport rollers are arranged to the sides of the vacuum table. In general, the placement of the transport rollers is adjacent the vacuum table with the vacuum table located between the transport rollers such that the coated polymer film can be rolled off and on parallel to the surface of the vacuum table by the transport rollers. The film can thus be processed directly from the roller in a continuous process. In addition, the sequential processing prevents damaging the film since the film surface is optimally protected in the rolled-up state. Instead of rerolling the coated polymer film onto the top transport roller after processing, the film can also be fed by a deflection roller to direct further processing.

The laser treatment of the coated polymer film occurs in that, first, a section of the polymer film is rolled off from the bottom transport roller and rolled up by the top transport roller and the transport rollers are stopped. In a vertical arrangement of the vacuum table, the bottom transport roller is situated below the vacuum table, whereas the top transport roller is situated above the vacuum table. In a horizontal arrangement of the vacuum table, the top transport roller and the bottom transport roller are installed laterally on opposite sides of the vacuum table. The coated polymer film is, as a result, situated with the coating pointed upward over the vacuum table. A negative pressure is applied via vacuum nozzles in the top plate of the vacuum table and removes the air between the vacuum table and the coated polymer film. A negative pressure is applied on the vacuum table, by which means the coated polymer film is tensioned, and, thus, wrinkling during processing is prevented. In the film region above the glass plates, there is no negative pressure since the vacuum nozzles are covered by the glass plates. However, since a negative pressure is applied in the surrounding region, the coated polymer film is also tensioned and wrinkle-free in the region of the glass plates. A decoated region is produced on the surface of the coated polymer film in the film region above the glass plates by means of laser treatment. The negative pressure is then removed and a new section of the coated polymer film is positioned by means of the transport rollers. The particles ablated during the laser treatment are removed by a particle suction system.

The laser processing of the coated polymer film takes place in a chamber with a protective gas atmosphere. The protective gas atmosphere prevents corrosion of the coating on the edges of the decoated region. The laser introduces a great amount of energy due to which the coating heats up in the processed region. On the edge of the decoated region, the metal of the coating would be oxidized due to this heating upon contact with oxygen. For this reason, the laser treatment must be performed with the exclusion of oxygen. The protective gas atmosphere contains preferably nitrogen, argon, and/or mixtures thereof.

The laser treatment is done using at least one 2D laser scanner or 3D laser scanner. These laser scanners are arranged perpendicular to the surface of the coated polymer film. 2D laser scanners have a maximum operating area of 500 mm width and 500 mm length. Thus, in the case of large panes or multiple sensor windows in different regions of the pane, multiple 2D laser scanners must be used in order to cover the complete region to be processed. Alternatively, a 2D laser scanner can be mounted on an axle such that it is appropriately movable in the entire operating area. A 3D laser scanner covers an area of 1 m width and 1 m length, as a result of which a single 3D laser scanner usually suffices for the complete operating area. However, for reasons of cost, one or a plurality of 2D laser scanners are preferably used.

Pulsed solid-state lasers are preferably used as the laser source. Particularly preferably, a neodymium-doped yttrium aluminum garnet laser (Nd:YAG laser) is used. Alternatively, ytterbium (Yb:YAG laser) or erbium (Er:YAG laser) can also be used as dopants or titanium:sapphire lasers or neodymium-doped yttrium vanadate lasers (Nd:YVO$_4$ laser) can be used. The Nd:YAG laser emits infrared radiation of a wavelength of 1064 nm. However, by frequency doubling or frequency tripling, radiation of the wavelengths 532 nm and 355 nm can also be generated.

With the use of a 2D laser scanner, the laser beam generated by the laser source strikes a beam expander and is diverted from there by a mirror to the 2D laser scanner. With 3D laser scanners, the laser beam from the laser source is diverted directly to the 3D laser scanner by a mirror.

The laser treatment is done using a wavelength from 300 nm to 1300 nm. The wavelength used depends on the type of coating. The preferably used Nd:YAG laser can provide laser radiation of the wavelengths 355 nm, 532 nm, and 1064 nm. For the processing of silver coatings, a wavelength of 532 nm is preferably used.

The laser treatment is preferably done with a power of 1 W to 150 W, particularly preferably with the power of 10 W to 50 W.

The first laminating film and the second laminating film comprise a polyvinyl butyral, ethylene vinyl acetate, polyurethane, and/or mixtures and/or copolymers thereof. Polyvinyl butyral is preferably used.

The first laminating film and the second laminating film have a thickness from 0.1 mm to 0.8 mm, preferably from 0.3 mm to 0.5 mm.

The polymer film contains polyethylene terephthalate, polyethylene, polypropylene, polycarbonate, polybutylene terephthalate, polyethylene naphthalate, and/or mixtures and/or copolymers thereof. Polyethylene terephthalate is preferably used.

The polymer film has a thickness from 20 µm, to 120 µm, preferably from 40 µm to 60 µm.

The coating of the coated polymer film is preferably metal-containing and includes, particularly preferably, silver, gold, copper, indium, tin, zinc, rhodium, platinum, palladium, and/or mixtures and/or alloys thereof. For an application as a sun protection coating, silver is preferably used.

The coating has a thickness from 1 nm to 500 nm, preferably from 50 nm to 250 nm.

In the decoated region of the coated polymer film, at least 80 percent by weight, preferably at least 90 percent by weight of the coating is removed.

The laser beam is focused on the coating of the coated polymer film such that the coating is as completely removed as possible. With an exact focusing of the laser beam, the coating to be removed, possibly the polymer film and, if need be, a part of the glass plate is located within this focus. However, the glass plates are not damaged by the laser beam. Thus, in contrast to a vacuum table without glass plates, as known from the prior art, no damage of the vacuum table occurs due to the use according to the invention of the glass plates. With incorrect focusing of the laser beam, even the top plate of the vacuum table could be damaged by laser radiation that strikes the top plate through the decoated polymer film and the glass plates. Even with such an undesirable damage of the top plate, the metal particles created in the process are, however, held back by the glass plates and damaging of the polymer film by metal particles is avoided according to the invention.

The decoated region has a size from 2 cm$^2$ to 200 cm$^2$, preferably from 20 cm$^2$ to 120 cm$^2$.

The decoated region preferably has a maximum fraction of 15%, particularly preferably a maximum fraction of 5%, of the entire surface of the pane.

In the decoated region, the mean transmission for electromagnetic radiation in the wavelength range from 300 nm to 1300 nm is at least 75%, preferably at least 85%.

The invention further includes a device for laser treatment of a flexible coated polymer film, which includes a vacuum table, at least one glass plate affixed on the vacuum table, at least one 2D laser scanner or a 3D laser scanner, a chamber with protective gas, and two transport rollers. The vacuum table includes a swivel arm on which a bottom plate is mounted and a top plate, which is affixed on the bottom plate. One or a plurality of glass plates, which are glued into countersinks on the top plate of the vacuum table, are situated on the vacuum table. The laser scanners are aligned perpendicular to the surface of the vacuum table. The operating area of the 3D laser scanner or the 2D laser scanners covers at least the region of the glass plates. The vacuum table and the laser arrangement are surrounded by the chamber with protective gas. Outside the chamber, two transport rollers, which transport the coated polymer film through the chamber over the vacuum table, are situated.

Special embodiments of the process according to the invention include the processing of a bilayer made up of a first laminating film and a coated polymer film. The bilayer is presented in roll form and rolled off the transport rollers such that the coating of the coated polymer film points in the direction of the laser scanners. Other embodiments of the process according to the invention include the processing of rigid substrates as coated glass substrates. Rigid substrates can not be processed by the rollers, but must instead be inserted manually.

In the following, the invention is explained in detail with reference to drawings. The drawings in no way restrict the invention.

Figure 1A:
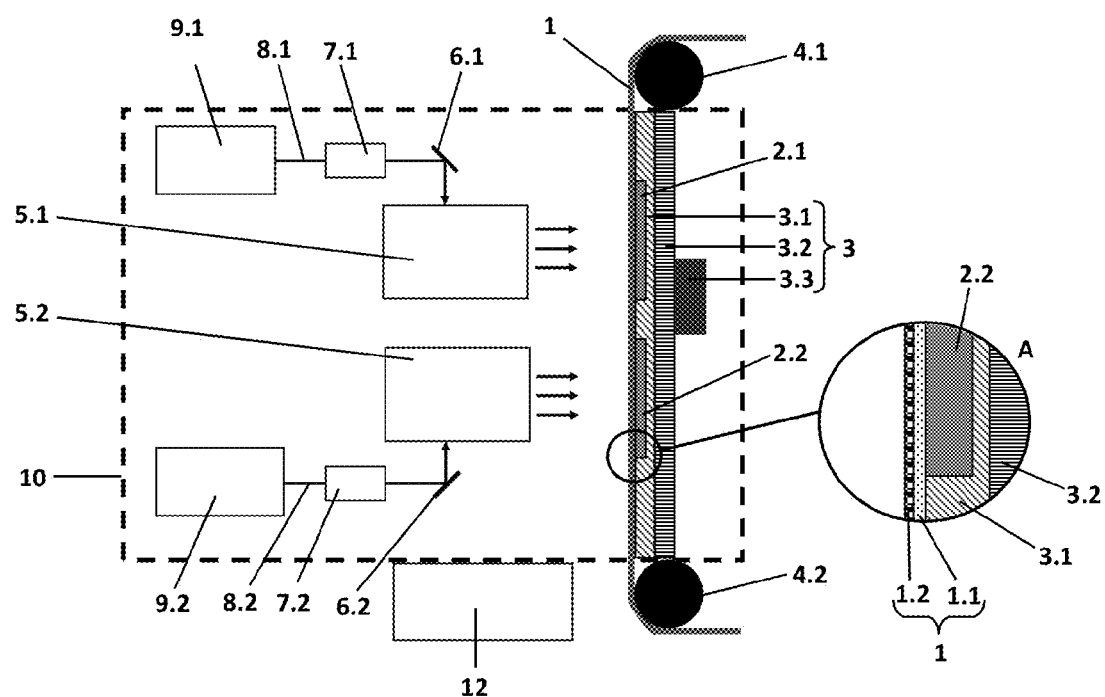

They depict:

FIG. 1 and FIG. 1A a schematic view of the device according to the invention for processing a coated polymer film by means of a 2D laser scanner.

Figure 2:
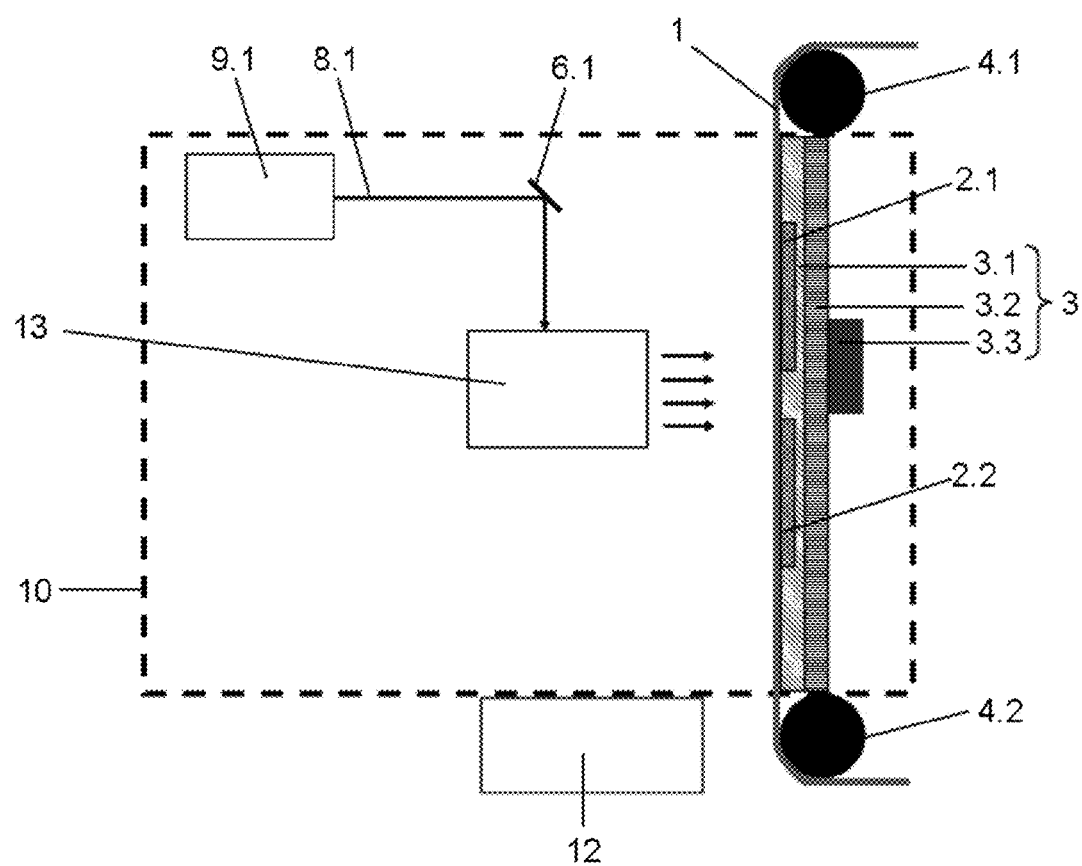

FIG. 2 a schematic view of the device according to the invention for processing a coated polymer film by means of a 3D laser scanner.

Figure 3:
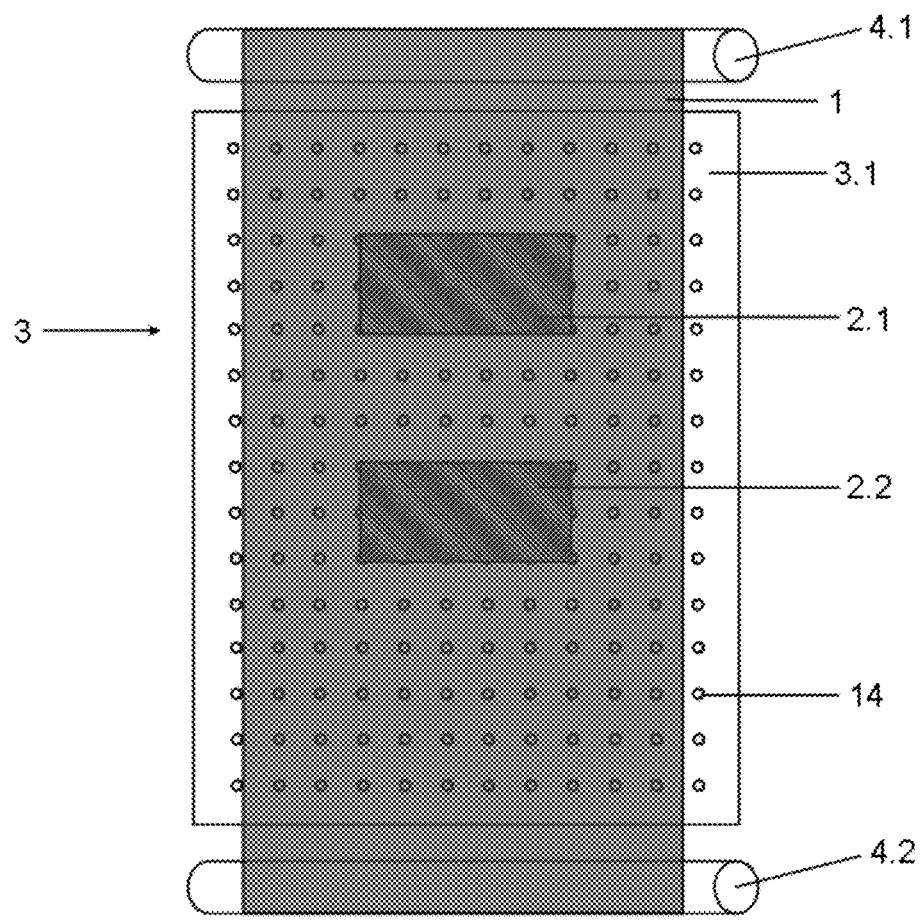

FIG. 3 a schematic plan view of the vacuum table overlaid with glass plates and spanned by a polymer film.

Figure 4:
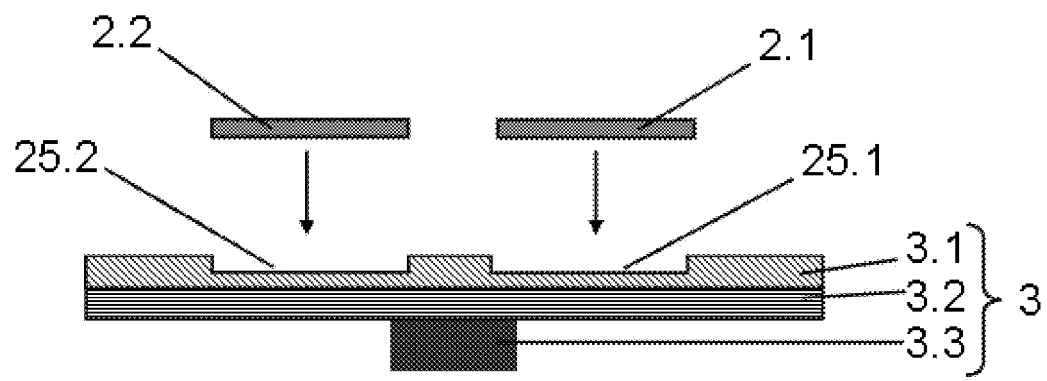

FIG. 4 a schematic view of the composition of the vacuum table overlaid with glass plates.

Figure 5:
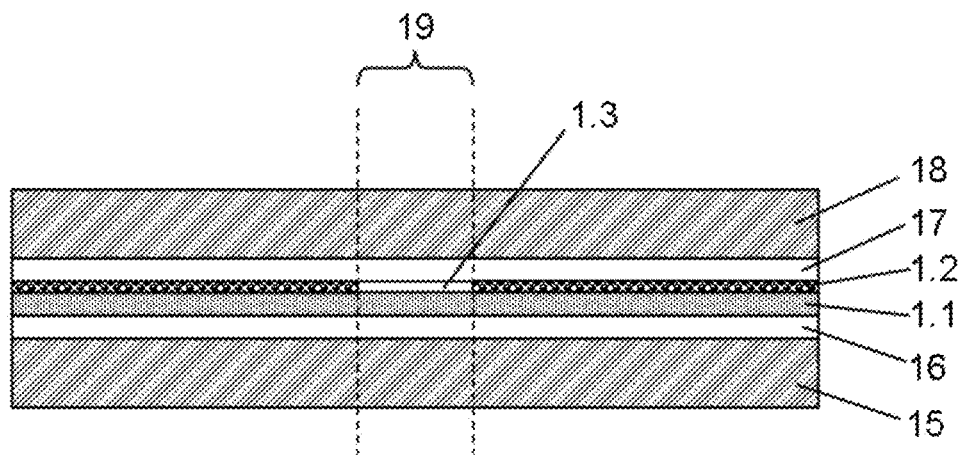

FIG. 5 a schematic view of a laminated glass pane produced in accordance with the process according to the invention.

Figure 6:
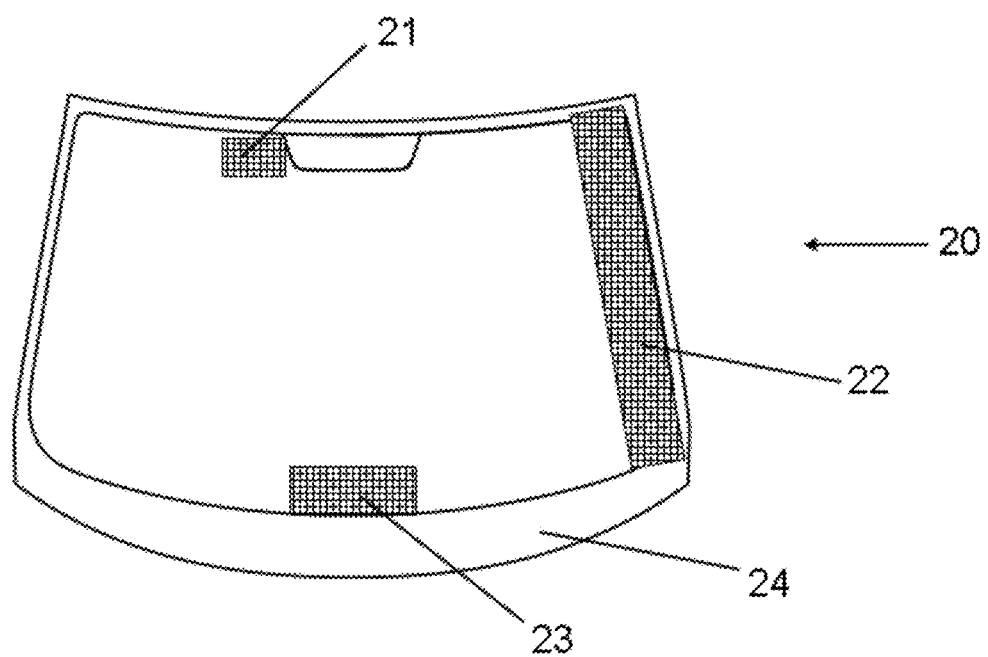

FIG. 6 a schematic view of the windshield with sensor windows.

Figure 7:
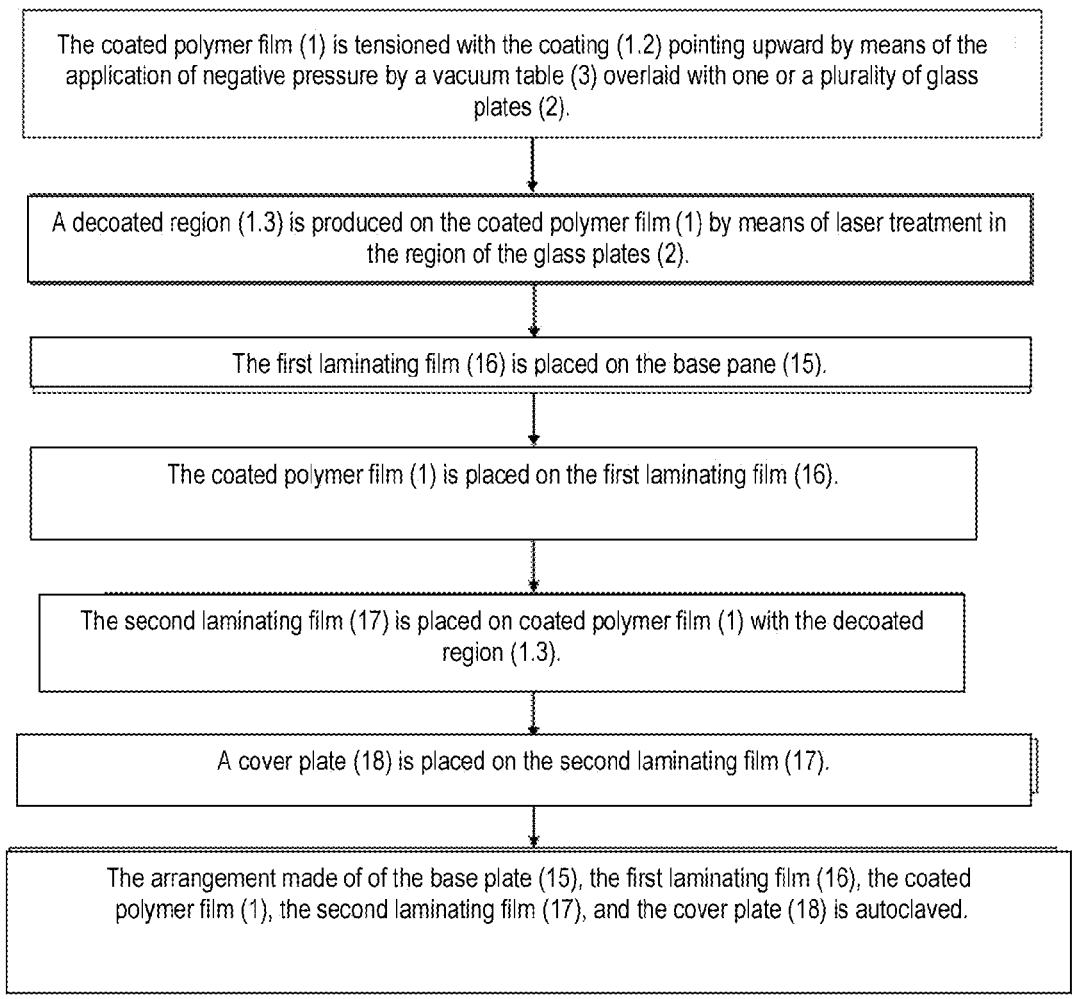

FIG. 7 a flowchart of the process according to the invention for producing a laminated glass pane with a sensor window.

FIG. 1 depicts a schematic view of the device according to the invention for processing a coated polymer film (1) by means of 2D laser scanners (5.1, 5.2). The coated polymer film (1) is rolled off from a bottom transport roller (4.2) and rerolled onto a top transport roller (4.1). Between the two transport rollers (4), the coated polymer film (1) is tensioned in sections by way of a vacuum table (3). The vacuum table (3) includes a swivel arm (3.3) on which a bottom plate (3.2) is mounted. A top plate (3.1) is affixed on the bottom plate (3.2). A first glass plate (2.1) and a second glass plate (2.2) are flush mounted into the top plate (3.1). The vacuum table (3) is arranged vertically to enable a space-saving structure of the system. The 2D laser scanners (5.1, 5.2) point in the direction of the surface of the coated polymer film (1). Both 2D laser scanners (5.1, 5.2) have a laser source (9.1, 9.2) of their own. The laser beam (8.1) emitted from a first laser source (9.1) first strikes a first beam expander (7.1) and is then guided via a first deflection mirror (6.1) to the first 2D laser scanner (5.1). The arrangement consisting of the second laser source (9.2), second beam expander (7.2), and second deflection mirror (6.2) is installed parallel to the first beam path. The second laser beam (8.2) is guided starting from the second laser source (9.2) to the second beam expander (7.2) and, from there, via a second deflection mirror (6.2) to the second laser scanner (5.2). The operating area of the 2D laser scanners (5.1, 5.2) covers at least the film area above the glass plates (2.1, 2.2). The vacuum table (3) with glass plates (2.1, 2.2) and coated polymer film (1) as well as the laser arrangement (9, 8, 7, 6, 5) are situated in a chamber (10). The chamber (10) is filled with protective gas to prevent oxidation of the surface at the time of processing. The transport rollers (4) are situated outside the chamber (10). A particle suction system (12), via which the particles created during the processing are removed, is installed on the floor of the chamber (10).

FIG. 1A depicts a schematic view of the device according to the invention of FIG. 1, with an enlarged detail A. On the bottom plate (3.2) of the vacuum table (3), a top plate (3.3) is mounted into which a first glass plate (2.1) and a second glass plate (2.2) are mounted. A coated polymer film (1) is tensioned over the vacuum table (3) with the help of two transport rollers (4). The transport rollers (4) are, for this purpose, installed laterally relative to the vacuum table (3), with the bottom transport roller (4.2) situated below and the top transport roller (4.3) situated above the vertically arranged vacuum table (3). The coating (1.2) of the coated polymer film (1) to be processed in the process according to the invention points in the direction of the 2D laser scanners (5.1, 5.2), while the side of the polymer film (1.1) opposite the coating (1.2) rests directly on the vacuum table (3) after application of negative pressure.

FIG. 2 depicts a schematic view of the device according to the invention for processing a coated polymer film (1) by means of a 3D laser scanner (13). The coated polymer film (1) is rolled off from a bottom transport roller (4.2) and rerolled onto a top transport roller (4.1). Between the two transport rollers (4), the coated polymer film (1) is tensioned in sections by way of a vacuum table (3). The vacuum table (3) includes a swivel arm (3.3) on which a bottom plate (3.2) is mounted. A top plate (3.1) is affixed on the bottom plate (3.2). A first glass plate (2.1) and a second glass plate (2.2) are flush mounted in the top plate (3.1). The vacuum table (3) is arranged vertically to enable a space-saving structure of the system. The 3D laser scanner (13) points in the direction of two glass plates (2.1, 2.2). The operating area of the 3D laser scanner (13) covers at least the film area above the two glass plates (2.1, 2.2). A first laser source (9.1) emits a first laser beam (8.1), which is guided via a first deflection mirror (6.1) to the 3D laser scanner (13). The vacuum table (3) with glass plates (2.1, 2.2) and coated polymer film (1) as well as the laser arrangement (9, 8, 7, 6, 5) are situated in a chamber (10). The chamber (10) is filled with protective gas to prevent oxidation of the surface at the time of processing. The transport rollers (4) are situated outside the chamber (10). A particle suction system (12), via which the particles created during the processing are removed, is installed on the floor of the chamber (10).

FIG. 3 depicts a schematic top plan view of the vacuum table (3) overlaid with glass plates (2.1, 2.2) and spanned by a coated polymer film (1). The coated polymer film (1) is rolled off from a bottom transport roller (4.2) and rerolled on a top transport roller (4.1). Between the two transport rollers (4.1, 4.2) is situated the vacuum table (3) over whose top plate (3.1) the coated polymer film (1) is stretched. The top plate (3.1) of the vacuum table (3) has, at regular intervals, holes that serve as vacuum nozzles (14). A first glass plate (2.1) and a second glass plate (2.2) are flush mounted into the surface of the top plate (3.1).

FIG. 4 depicts a schematic view of the composition of the vacuum table (3) overlaid with glass plates (2.1, 2.2). The vacuum table (3) includes a swivel arm (3.3) on which a bottom plate (3.2) is mounted. A top plate (3.1) is affixed on the bottom plate (3.2). A first countersink (25.1) and a second countersink (25.2), which correspond in shape and size to the first glass plate (2.1) and the second glass plate (2.2), are made in the top plate (3.1). The first glass plate (2.1) is inserted flush in the first countersink (25.1) and the second glass plate (2.2) is inserted flush in the second countersink (25.2). Both glass plates (2.1, 2.2) are fixed in the countersinks (25), preferably by means of an adhesive.

FIG. 5 depicts a schematic view of a laminated glass pane produced in accordance with the process according to the invention. The laminated glass pane comprises a base pane (15), a first laminating film (16) on the base pane (15), a coated polymer film (1) on the first laminating film (16), a second laminating film (17) on the coated polymer film (1), and a cover pane (18) on the second laminating film (17). The coated polymer film (1) comprises a polymer film (1.1) and a coating (1.2), with a section of the coating (1.2) removed and a decoated region (1.3) formed. In the region of the laminated glass pane that contains the decoated region (1.3) of the coated polymer film (1), a sensor window (19) develops.

FIG. 6 depicts a schematic view of the windshield with sensor windows (20). On the top edge of the windshield, sensor windows for a toll transponder (21) are required; whereas the sensor windows for antennas (22) are introduced on the side edge, and the sensor windows for a radar detector (23) are installed on the bottom edge of the pane. The pane edge with black printing (24) is, for the most part, no longer visible after integration of the windshield into the motor vehicle.

FIG. 7 depicts a flowchart of the process according to the invention for producing a laminated glass pane with a sensor window. The coated polymer film (1) is, in a first step, tensioned with the coating (1.2) pointing upward by application of negative pressure by way of the vacuum table (3) overlaid with one or a plurality of glass plates (2.1, 2.2). Then, in the region of the glass plates (2.1, 2.2) a decoated region (1.3) is produced on the coated polymer film (1). This coated polymer film (1) with a decoated region (1.3) is used in the film composite of a windshield. For this, the first laminating film (16) is placed on the base pane (15), and the coated polymer film (1) with a decoated region (1.3) is placed on the first laminating film (16). The second laminating film (17) is placed on the coated polymer film (1) with a decoated region (1.3), and the stack of films is completed with a cover pane (18). Next, the pane arrangement is autoclaved and a laminated glass pane is thus produced.

In the following, the invention is explained in detail with reference to an example of the process according to the invention and a comparative example.

In two series of tests, the economics of the production of a laminated glass pane with a sensor window according to the prior art and according to the process according to the invention were compared. The area of the laminated glass pane produced in both test series was 12 m$^2$. In both laminated glass panes, two sensor windows each with a total area of 100 cm$^2$ were produced. In both test series, identical glass panes made of float glass with a thickness of 2.1 mm were used. A base pane (15) and a cover pane (18) were pre-bent together in the gravity bending process. A PVB film with a thickness of 0.38 mm (Solutia/Safflex (RK11)) was used as the first laminating film (16) and as the second laminating film (17). A 50-nm-thick PET film from the company Southwall (XIR 75-G2) with a silver coating was used as the polymer film (1.1). A decoated region (1.3) was produced, in that the coating (1.2) of the coated polymer film (1) was removed with two 2D laser scanners (5.1, 5.2) at a wavelength of 532 nm and a power of 20 W. Nd:YAG lasers were used as laser sources (9.1, 9.2). The coated polymer films (1) with a decoated region (1.3) processed according to Example 1 or Comparative Example 2 were used in the film composite of a laminated glass pane. A first laminating film (16) was placed on a base pane (15). The polymer film (1) processed according to Example 1 or Comparative Example 2 was arranged on the first laminating film. A second laminating film (17) was placed on the coated polymer film (1) and the stack of films was completed with a cover pane (18). This arrangement was pre-evacuated in a plastic bag (COEX, BUERGOFOL GmbH, D-93354 Siegenburg) at a pressure of 1 mbar, at room temperature for 5 minutes. Finally, the pre-laminated pane produced in this manner was laminated in the autoclave for 2.5 hours at 80° C. to 120° C. and 8 bar to 13 bar.

a) EXAMPLE 1

Production of a Laminated Glass Pane with a Sensor Window in Accordance with the Process According to the Invention A coated polymer film (1) was presented in roll form and rolled off from a bottom transport roller (4.2) and an rolled onto a top transport roller (4.1). A vacuum table (3) was arranged between the two transport rollers (4). The vacuum table (3) comprised a swivel arm (3.3), a bottom plate (3.2) on the swivel arm (3.3), and a top plate (3.1) on the bottom plate (3.2). The material of the top plate (3.1) was aluminum. The top plate (3.1) had two countersinks (25.1, 25.2), into which two glass plates (2.1, 2.2) with a thickness of 2.1 mm were glued flush. The positions of the glass plates (2.1, 2.2) corresponded to the positions of the subsequent sensor windows (19). The laser arrangement (9, 8, 7, 6, 5), the vacuum table (3) with glass plates (2.1, 2.2), and the coated polymer film (1) where situated inside a chamber (10) with protective gas, onto which a particle suction system (12) was connected. The coated polymer film (1) was rolled off in sections by the transport rollers (4), with the coating (1.2) of the coated polymer film (1) oriented upward in the direction of the 2D laser scanners (5). The transport rollers (4) were stopped and negative pressure was applied on the vacuum table (3). The air between the vacuum table (3) and the coated polymer film (1) was removed by means of vacuum nozzles (14) in the top plate (3.1) and the coated polymer film (1) was tensioned. The coating (1.2) of the coated polymer film (1) was then ablated in the region of the glass plates (2.1, 2.2) with two 2D laser scanners (5.1, 5.2). The top plate (3.1) of the vacuum table (3) was protected by the glass plates (2.1, 2.2), by which means the surface of the vacuum table (3) was not damaged. Thus, the ablation of metal particles was prevented. Thus, a cleaning of the vacuum table (3) was unnecessary. The negative pressure was removed and a new film section was placed via the transport rollers (4).

COMPARATIVE EXAMPLE 2 b) Production of a Laminated Glass Pane with Sensor Window According to the Prior Art In the Comparative Example 2, a laminated glass pane with a sensor window was produced as in Example 1 with the difference that no glass plates (2) were inserted into the top plate (3.1) of the vacuum table (3). As a result, the top plate (3.1) of the vacuum table (3) was damaged during the laser treatment of the coated polymer film (1), which resulted in ablation of metal particles on the table surface. These metal particles adhered to the coated polymer film (1) and resulted in damage thereto. In order to keep the damage to the coating (1.2) of the coated polymer film (1) as little as possible, after 100 processed film sections, a manual cleaning of the vacuum table was necessary.

Table 1 presents the cleaning cycles of the top plate (3.1) of the vacuum table (3) after the process according to the invention (Example 1) and the prior art (Comparative Example 2) and the resultant increase in the number of units produced.

TABLE 1

|  | Cleaning cycle | Number of units |
|---|---|---|
| Example 1 | No cleaning | ~150% |
| Comparative Example 2 | Every 100 panes | ≙100% |

According to the prior art, in each case after processing 100 foil sections, the top plate (3.1) of the vacuum table (3) had to be cleaned of metal particles that develop due to damage to the top plate (3.1) during the laser treatment. This damage to the top plate (3.1) can be completely avoided with the process according to the invention. Thus, according to the process according to the invention, a cleaning of the vacuum table (3) and an associated halt in production become superfluous. Thus, according to the process according to the invention, not only the personnel for the cleaning of the vacuum table (3) are cut, but the productivity of the system can also be increased. The number of units of panes per time unit produced in the Comparative Example 2 according to the prior art was normed to 100%. With the process according to the invention, an increase in production of at least 50% can be expected. The process according to the invention thus has enormous economic advantages since the productivity of the system is increased and, at the same time, the costs can be reduced by cutting personnel.

LIST OF REFERENCE CHARACTERS 1 coated polymer film
1.1 polymer film
1.2 coating
1.3 decoated region
2 glass plates
2.1 first glass plate
2.2 second glass plate
3 vacuum table
3.1 top plate
3.2 bottom plate
3.3 swivel arm
4 transport rollers
4.1 top transport roller
4.2 bottom transport roller
5 2D laser scanner
5.1 first 2D laser scanner
5.2 second 2D laser scanner
6 deflection mirrors
6.1 first deflection mirror
6.2 second deflection mirror
7 beam expanders
7.1 first beam expander
7.2 second beam expander
8 laser beam
8.1 first laser beam
8.2 second laser beam
9 laser source
9.1 first laser source
9.2 second laser source
10 chamber
12 particle suction system
13 3D laser scanner
14 vacuum nozzles
15 base pane
16 first laminating film
17 second laminating film
18 cover pane
19 sensor windows
20 windshield with sensor windows
21 sensor window for toll transponder
22 sensor window for antennas
23 sensor window for radar detector
24 pane edge with black printing
25 countersinks
25.1 first countersink
25.2 second countersink
A detail

The invention claimed is:

1. A process for producing a laminated glass pane made up of a base pane, a first laminating film, a coated polymer film with a coating, a second laminating film, and a cover pane with at least one sensor window, comprising:
    a) tensioning the coated polymer film with a coating pointing upward by way of a vacuum table and transport rollers,
    b) producing at least one decoated region on the coated polymer film by means of laser treatment,
    c) providing an arrangement by arranging the first laminating film on the base pane, arranging the coated polymer film on the first laminating film, arranging the second laminating film on the coated polymer film, and arranging the cover pane on the second laminating film, and
    d) autoclaving the arrangement,
    wherein the at least one decoated region is produced above glass plates with which the vacuum table is equipped.

2. The process according to claim 1, wherein the vacuum table is operated with a swivel arm, with a bottom plate on the swivel arm, and with a top plate on the bottom plate.

3. The process according to claim 1, wherein the vacuum table is arranged vertically.

4. The process according to claim 1, wherein the vacuum table is operated with glass plates inlaid in countersinks of the top plate.

5. The process according to claim 1, wherein the glass plates are affixed with an adhesive from the group epoxy resins, polyurethane adhesive, silicones, cyanoacrylate adhesives, and/or mixtures thereof, particularly preferably epoxy resins.

6. The process according to claim 1, further comprises running continuously by rolling off the coated polymer film from the transport rollers, comprising:
    rolling off the coated polymer film off over the transport rollers above and below the vacuum table over the length of the vacuum table,
    stopping the transport rollers,
    applying a negative pressure between the vacuum table and coated polymer film via the vacuum nozzles of the vacuum table and tensioning the coated polymer film,
    producing at least one decoated region on the coated polymer film in the region of the glass plates by means of laser treatment,
    aerating the vacuum table, and
    removing the particles generated by the laser procedure by a particle suction system.

7. The process according to claim 1, wherein the laser treatment is performed in a chamber with a protective gas atmosphere, containing nitrogen and/or argon and/or mixtures thereof.

8. The process according to claim 1, wherein the coated polymer film is decoated by means of at least one 2D laser scanner or 3D laser scanner that is arranged perpendicular to the coated polymer film.

9. The process according to claim 8, wherein the coated polymer film is decoated with a wavelength of 300 nm to 1300 nm.

10. The process according to claim 1, wherein the coated polymer film is used with polyethylene terephthalate, polyethylene, polypropylene, polycarbonate, polybutylene terephthalate, polyethylene terephthalate, and/or mixtures and/or copolymers thereof, and the coating, is preferably a metal coating comprising silver, gold, copper, indium, tin, zinc, rhodium, platinum, palladium, and/or mixtures and/or alloys thereof.

11. The process according to claim 1, wherein at least 80 percent by weight, preferably at least 90 percent by weight of the coating is removed in the decoated region.

12. The process according to claim 1, wherein the decoated region has, in the wavelength range from 300 nm to 1300 nm, a mean transmission for electromagnetic radiation of at least 75%, preferably at least 85%.

13. A device for laser treating a coated polymer film, comprising:
    a vacuum table including a swivel arm, a bottom plate affixed on the swivel arm, a top plate affixed on the bottom plate,
    at least one glass plate inlaid in the top plate of the vacuum table, and
    a 3D laser scanner or at least one 2D laser scanner, which is aimed perpendicular to the surface of the vacuum table and whose operating area covers at least the region of the glass plates,
    wherein the device being arranged in a chamber with a protective gas atmosphere,
    wherein above and below the vacuum table are situated a bottom transport roller and a top transport roller, from which the coated polymer film is rolled off and rolled on in sections and which are situated outside the chamber.

14. A method comprising:
    using the device according to claim 13 for decoating the coated polymer film by means of laser treatment.

* * * * *